United States Patent
Vandecar

(10) Patent No.: US 11,292,731 B2
(45) Date of Patent: Apr. 5, 2022

(54) METHOD AND APPARATUS FOR TREATING CONTAMINATED FLUID MEDIUM

(71) Applicant: Christopher Vandecar, Thousand Oaks, CA (US)

(72) Inventor: Christopher Vandecar, Thousand Oaks, CA (US)

(*) Notice: Subject to any disclaimer, the term of this patent is extended or adjusted under 35 U.S.C. 154(b) by 45 days.

(21) Appl. No.: 15/887,368

(22) Filed: Feb. 2, 2018

(65) Prior Publication Data

US 2019/0039919 A1 Feb. 7, 2019

Related U.S. Application Data

(60) Provisional application No. 62/453,668, filed on Feb. 2, 2017.

(51) Int. Cl.
*C02F 1/28* (2006.01)
*B01J 20/24* (2006.01)
(Continued)

(52) U.S. Cl.
CPC ............... *C02F 1/286* (2013.01); *B01J 20/24* (2013.01); *B01D 39/04* (2013.01); *C02F 1/001* (2013.01);
(Continued)

(58) Field of Classification Search
CPC .......... B01J 20/24; B01D 39/04; C02F 1/286; C02F 2101/306; C02F 2101/20; C02F 2101/203; C02F 1/02; C02F 2101/12; C02F 2203/002; C02F 1/001; C02F 101/103; C02F 2101/006; C02F 2101/322; C02F 1/283
See application file for complete search history.

(56) References Cited

U.S. PATENT DOCUMENTS 5,344,626 A 9/1994 Abler
5,626,881 A 5/1997 Lown
(Continued)

FOREIGN PATENT DOCUMENTS

CN 103519214 A 1/2014
CN 103564587 A 2/2014
(Continued)

OTHER PUBLICATIONS

Wikipedia; "Relative Density;" (Sep. 7, 2018); 11 pages; [retrieved on Oct. 15, 2018]; Retrieved from <URL: https://en.wikipedia.org/wiki/Relative_density >.
(Continued)

*Primary Examiner* — Vishal V Vasisth
(74) *Attorney, Agent, or Firm* — Thorpe North & Western, LLP

(57) ABSTRACT

The present disclosure provides for a method of filtering pollutants from a contaminated fluid stream. The method includes disposing unprepared humic shale in a container, contacting the unprepared humic shale with an aqueous solution, maintaining the aqueous composition in contact with the unprepared humic shale for a period of time, drying the humic shale, and then placing polluted water in contact with the humic shale until pollutants have been removed from the fluid.

14 Claims, 4 Drawing Sheets

(51) Int. Cl.

| | |
|---|---|
| B01D 39/04 | (2006.01) |
| C02F 1/02 | (2006.01) |
| C02F 1/00 | (2006.01) |
| C02F 101/32 | (2006.01) |
| C02F 101/12 | (2006.01) |
| C02F 101/10 | (2006.01) |
| C02F 101/20 | (2006.01) |
| C02F 101/00 | (2006.01) |
| C02F 101/30 | (2006.01) |

(52) U.S. Cl.
CPC ............... *C02F 1/02* (2013.01); *C02F 1/283* (2013.01); *C02F 2101/006* (2013.01); *C02F 2101/103* (2013.01); *C02F 2101/12* (2013.01); *C02F 2101/20* (2013.01); *C02F 2101/203* (2013.01); *C02F 2101/306* (2013.01); *C02F 2101/322* (2013.01); *C02F 2203/002* (2013.01)

(56) References Cited

U.S. PATENT DOCUMENTS

| | | | |
|---|---|---|---|
| 5,906,960 A * | 5/1999 | Sanjay | ............... B01J 20/24 502/400 |
| 6,440,436 B1 | 8/2002 | Ghosal | |
| 7,896,944 B2 | 3/2011 | Karr | |
| 7,964,234 B2 | 6/2011 | Mower et al. | |
| 8,383,840 B1 | 2/2013 | McMahon | |
| 9,820,953 B2 | 11/2017 | Black et al. | |
| 2003/0039662 A1 | 2/2003 | Ghosal | |
| 2004/0261481 A1 | 12/2004 | Anaya-Olvera | |
| 2007/0212434 A1 | 9/2007 | Day et al. | |
| 2009/0204187 A1 | 8/2009 | Mankovitz | |
| 2010/0010089 A1 | 1/2010 | Dyke et al. | |
| 2011/0237438 A1 | 9/2011 | Marihart | |
| 2012/0149697 A1 | 6/2012 | Legname et al. | |
| 2012/0279266 A1 | 11/2012 | Dyke et al. | |
| 2013/0337116 A1 | 12/2013 | Petralia | |
| 2016/0008417 A1 * | 1/2016 | Vandecar | ............... A61K 36/31 424/549 |
| 2017/0246132 A1 | 8/2017 | Black et al. | |

FOREIGN PATENT DOCUMENTS

| | | |
|---|---|---|
| JP | 2006/087393 A | 4/2006 |
| JP | 2006087393 A | 4/2006 |
| KR | 100197168 B1 | 6/1999 |

OTHER PUBLICATIONS

Barmac; "UMX-Liquid-PIS;" Information Sheet; (Sep. 7, 2016); 2 pages.
Lawrie Co.; "Liquid Fulvic Flyer;" BioMAX; (Feb. 5, 2013); 1 page.
Malan; "Review: Humic and Fulvic Acids. A Practical Approach;" AgriLibrium; (Sep. 2018); 21 pages.
Solufeed Limited; "Fulvic 25 Fulvic Acid;" Technical Information; (Mar. 2017); 3 pages.
PCT Application No. PCT/US15/25001, Filing date Apr. 8, 2015, International Search Report dated Jul. 15, 2015, 13 Pages.

* cited by examiner

METHOD AND APPARATUS FOR TREATING CONTAMINATED FLUID MEDIUM

PRIORITY CLAIM

This application claims priority to U.S. Ser. No. 62/453,668 filed on Feb. 2, 2017 entitled "Method and Apparatus for Treating Contaminated Fluid Medium" which is incorporated herein by reference in its entirety.

FIELD

This application relates generally to the treatment of contaminated fluids and more specifically to the modification and use of humic substances as a medium for treating contaminated fluids.

BACKGROUND

Pollution has become a major challenge and health hazard, as the world's water and air supply is becoming more and more contaminated. Examples of contaminants in water include organic molecules, including hydrocarbons such as petroleum and benzene, pesticides, insecticides, and herbicides; pharmaceutical pollutants; inorganic pollutants such as heavy metals, fertilizers, chemical waste, arsenic, and ammonia; and radionuclide contaminants. Contaminants in the water may make it unfit for human consumption, dangerous for activities such as bathing or swimming, and unsafe for use for irrigation. Essentially, contaminated water may be unfit for any purpose and have a deleterious impact on humans, ecology, and the environment.

There are several means of filtering or purifying water known in the art. Activated charcoal is known to filter some types of molecules through an adsorption, a process in which certain molecules are trapped within the pore structure of the charcoal. However, activated charcoal is not effective at removing certain types of toxins or radioactive nucleotides. Distillation is also used to purify water. However, many organics, such as pesticides are often not removed. Further, distillation may remove desirable substances from water, such as minerals. Additionally, distillation requires large energy expenditures to heat the water to its boiling point. Ion exchange resins are used for purification by removing polarized ions from water. Ion exchange resins are ineffective at removing some particles and bacteria, however. Reverse osmosis can also be used for water purification. Reverse osmosis uses pressure to push water through a semi-permeable membrane, which retains ions and dissolved molecules. Reverse osmosis purifies water more slowly than other methods, though. Additionally there is significant water that must be discarded during the reverse osmosis process.

Among the primary disadvantages of these methods for filtering water is that many of the systems are effective at filtering only one type of pollutant. Therefore, it may be necessary to treat water using multiple methods. This can be cumbersome, time consuming, and expensive. Further, many of the existing filtration methods require large expenditures of energy. Therefore, a method is needed to filter pollutants from water that is efficient, effective against the majority of pollutants, and that is economical.

Additionally, air has also become increasingly polluted, contributing to respiratory problems and degradation to the environment. Common air pollutants include toxic metals, oxidants, volatile organics, radon, and non-particles. Air filtration methods in the art include HEPA filters, UV light, and activated carbon. However, the existing methods are limited in that they might only be effective at filtering a discrete type of contaminant. Accordingly, a method of air filtration is needed that can filter a broad range of pollutant types.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

DETAILED DESCRIPTION

Figure 1:
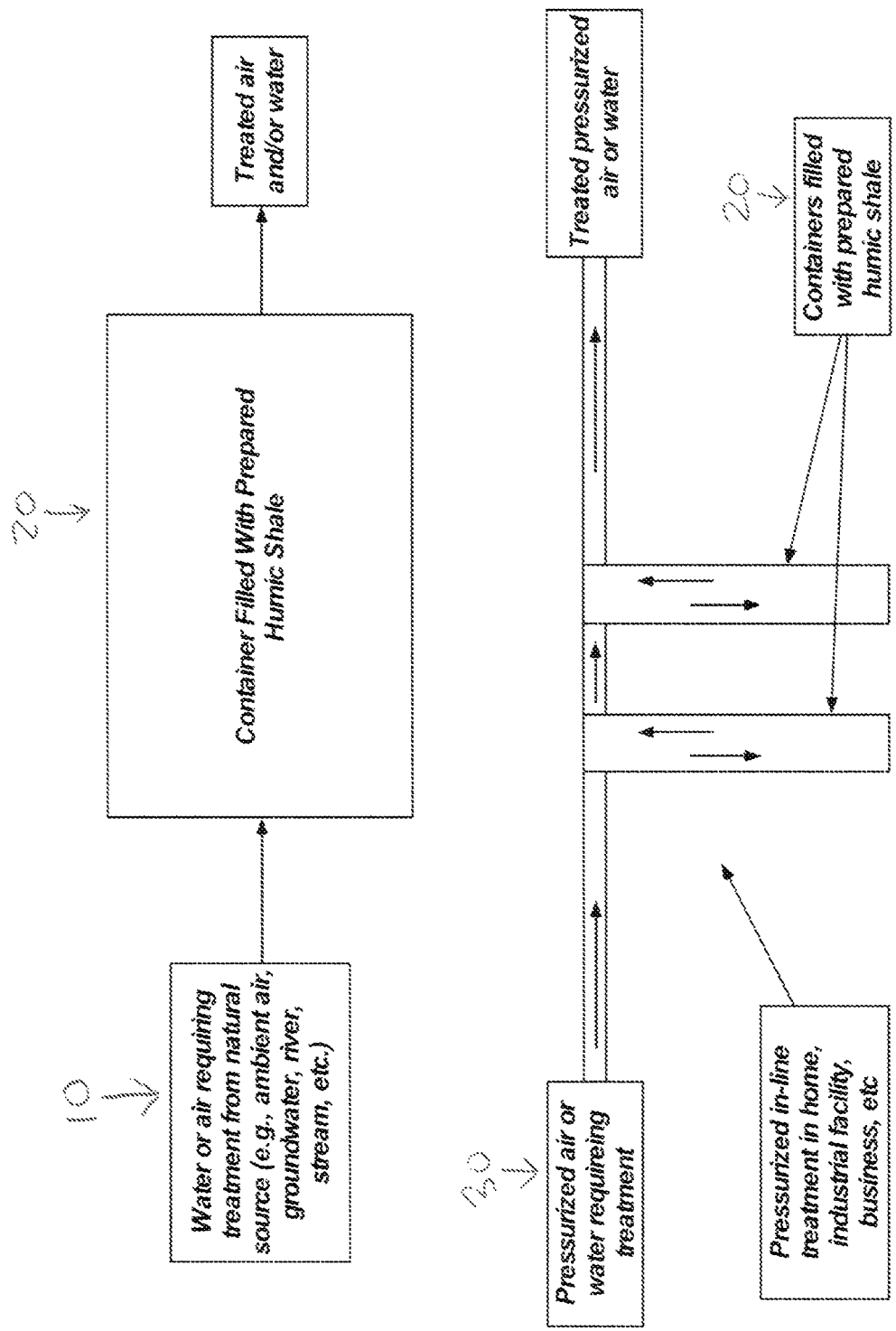
FIG. 1 is a diagram showing polluted water filtered by a filtration tube packed with a humic substance in accordance with one aspect of the technology.

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a line" includes a plurality of such lines.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," in this specification it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.8, 3, 3.1, 4, 4.6, and 5, individually.

This same principle applies to ranges reciting only one numerical value as a minimum or a maximum. Furthermore, such an interpretation should apply regardless of the breadth of the range or the characteristics being described.

As used herein, "enhanced," "improved," "performance-enhanced," "upgraded," "improvement," and the like, when used in connection with the description of a device, component, or process, refers to a characteristic of the device, component or process that provides measurably better form, function, or outcome as compared to previously known devices or processes. This applies both to the form and function of individual components in a device or process, as well as to such devices or processes as a whole.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

The present disclosure provides for a method of filtering pollutants from water and air that addresses the disadvantages of the prior art. The method includes preparing a humic substance (e.g., humic shale) by disposing it in a container, contacting the humic substance with an aqueous composition, maintaining the aqueous composition in contact with the humic substance for a period of time until the humic substance is "depleted," and drying the humic substance. Once the humic substance has been dried, a contaminated fluid medium (air or water, for example) is passed through the prepared humic substance until an amount of pollutants are removed.

Humic substances are natural complex organic materials that are acidic (about pH 3.4 to pH 4.1). The term "humic substance" is used herein in a generic sense to distinguish the natural material from its fractions, namely humic acid, fulvic acid and humin. The predominant source of humic substances is leonardite, a naturally occurring ore found associated with coal deposits. Leonardite is also known as humate, brown coal, lignite, slack lignite, oxidized lignite, weathered lignite, humic shale, humalite, carbonaceous shale, colloidal minerals, concentrated humus, humus coal, or dead organic matter. Leonardite is a complex mixture of high and low molecular weight humic substances. The lower molecular weight constituents—generally referred to as fulvic acids—are primarily responsible for the solubilization of minerals. The higher molecular weight components—known as the humic acids—are also engaged in solubilizing minerals and have a high capacity for stimulating biological activity and great potential for chelation.

As used herein, the term "humic shale" is a subset of the broader term humic substances and refers to compositions, including shales, comprising high molecular weight heterogeneous organic substances that are the components of soils and sediments found in deposits, including pre-historic deposits, within the earth. In one aspect, humic shale comprises fulvic acids, humic acids, and combinations thereof. Generally speaking, humic acid is produced by biodegradation of dead organic matter. It is not a single acid; rather, it is a complex mixture of different acids containing carboxyl and phenolate groups so that the mixture behaves functionally as a dibasic acid or, depending on its composition, as a tribasic acid. Humic acids can form complexes with ions that are commonly found in the environment creating humic colloids. Humic acids are insoluble in water at acid pH, whereas fulvic acids, are soluble in water across the full range of pH. Moreover, fulvic acids are poly-electrolytes and are unique colloids that diffuse easily through membranes whereas other colloids may not.

Water or other liquids exposed to raw or "unprepared humic shale" may undergo many geo-chemical reactions and processes including the transport of metal ions, contribution to the cation and anion exchange, adsorption, and the binding of various organic molecules. The term "unprepared humic shale" as used herein refers to humic shale that has been excavated from its pre-historic organic deposit but has not been contacted by an aqueous solution as noted herein. As such, the "unprepared humic shale" contains a significant amount of naturally occurring carbon-based compositions, including humic and fulvic acids, originally found in the shale. In contrast, the term "prepared humic shale," or "depleted humic shale" however, resides in a state where the naturally occurring carbon structures, including humic and fulvic acids, have been at least partially or substantially removed. Once a portion of the humic and fulvic acids have been removed, the "prepared humic shale" is useable as an effective filtration medium. In one aspect, the prepared humic shale comprises aliphatic hydrocarbon functionalities, such as those found in lipids, waxes, cuticular materials, cutin/cutan, and suberin/suberan. There may also be small amounts of carbohydrates, peptides, and peptidoglycans The present disclosure provides a method for preparing humic shale to be used as a medium for removing chemical pollutants from a contaminated fluid stream, such as water or air. Generally speaking, the method includes disposing humic shale (or another humic substance) in a container, contacting the humic shale with an aqueous composition, maintaining the aqueous composition in contact with the humic shale for a period of time to form a solution and then removing the solution from the humic shale. While the aqueous solution is in contact with the humic shale, the naturally occurring humic and fulvic acids are "leached" from the humic shale leaving a composition having a surface area that has been chemically "depleted." The "depleted" or "prepared" humic shale is then dried. Once dry, the humic shale is placed in contact with the contaminated fluid stream at a predetermined flowrate or a volume of contaminated fluid is placed in contact with a volume of prepared humic shale.

The unprepared humic shale can be disposed in the container in large components (2 to 3 inches in diameter, e.g.) or smaller pieces or particles (20 to 30 nanometers, e.g.). In accordance with one aspect of the technology, the unprepared humic shale is crushed into small pieces ranging from 20 to 30 nanometers in diameter and placed in contact with an aqueous solution such as water. In one aspect, the aqueous solution comprises distilled water. In another aspect, the aqueous solution comprises tap water with mineral constituents, the water being treated to remove substantially all chlorine and fluoride constituents. In still another aspect, the aqueous solution comprises alcohol, including a weak water/alcohol mixture. In one aspect, the aqueous solution used in the formation process can be humic acid solutions of different concentrations, e.g. one having a specific gravity lower than 1 and/or having a pH that ranges between 1 and 7. In yet another aspect, the aqueous solution comprises a specific gravity that is greater than 1 and/or has a pH that ranges from between 7 and 14.

In one aspect, the step of preparing the humic shale for use as a pollutant-removing media includes pouring or dripping the aqueous solution over the unprepared humic shale and allowing it to pass through and around the unprepared humic shale. In some aspects, the unprepared humic shale can be submerged or substantially submerged in the aqueous solution. In one aspect, the unprepared humic shale can be completely submerged in a volume of the aqueous solution. The aqueous solution can be maintained in contact with the humic shale for a period of time (also referred to as the residence time) of about 24 hours to about 21 days. In another aspect, the aqueous solution can be maintained in contact with the unprepared humic shale for a period of time of about 36 hours to about 15 days. In yet another aspect, the aqueous solution can be maintained in contact with the unprepared humic shale for a period of time of about 5 days to about 14 days or 15 days to 4 months. In still another aspect, the aqueous solution can be maintained in contact with the humic shale for a period of 6-12 months. The residence time of the aqueous solution within the humic shale is a function of the acid content of the humic shale prior to being "prepared" as well as the type of aqueous solution being used. For example, in one aspect of the technology, a volume of an aqueous solution comprising distilled water having a pH of about 7 is placed in a vat or container housing unprepared humic shale. Because humic acids will leach out of the humic shale and into the water, the acidity level of the aqueous solution will increase. In one aspect of the technology, the aqueous solution is removed from the humic shale when the pH level of the aqueous solution has changed from about 7 to about 6.5 or 6. In another aspect, the aqueous solution is removed when the pH level has change from about 7 to about 5.5 or 5, about 7 to about 4.5 or 4, or about 7 to about 3.5 to 3. Heat may be applied to the humic shale to increase the rate at which humic acids will leach out of the humic shale. Likewise, the aqueous solution may be applied to the humic shale at a temperature greater than ambient temperature to increase the rate of leaching. For example, in one aspect of the technology where the ambient temperature is 80 degrees F., distilled water at a temperature of 100 degrees F. is placed in contact with the humic shale.

In accordance with one aspect of the technology, the unprepared humic shale is placed in a container having an exit orifice that regulates the flow of aqueous solution out of the container. The container is filled with the aqueous solution until it is full and then additional aqueous solution is added at the same rate that the aqueous solution exits the container. In one aspect, the exit orifice is placed on the bottom of the container and the aqueous solution is gravity-drained from the container. In this aspect, the size of the orifice may be adjusted in order to adjust the residence time of the aqueous solution in contact with the unprepared humic shale. For example, in one aspect, the container comprises a 55-gallon drum having an orifice in the bottom of the drum that is 20 mm in diameter. A volume of an aqueous solution is disposed in the 55-gallon drum until it is full. As the solution drains out of the bottom orifice and equivalent volume of the solution that is drained is added to the top of the drum. In another aspect, the 55-gallon drum is filled with aqueous solution and left for a predetermined period. After the predetermined period has passed, the aqueous solution is removed from the drum and the unprepared humic shale is removed for drying. However, in one non-limiting example, the unprepared humic shale shall may be left in the 55-gallon drum (i.e., its original container) with the humic shale be dried in situ. In one aspect, the container may be heated to increase the rate at which residual moisture is removed from the humic shale. In this manner, the humic shale need not be moved in and out of containers between its "prepared" and "unprepared" states.

After the humic shale has been in contact with the aqueous solution for a predetermined period of time, and materials, including iron, humic acids, fulvic acids, etc. have been substantially removed from the unprepared humic shale, the "prepared" humic shale may be removed from contact with the aqueous solution and dried. In one aspect, the unprepared humic shale can be dried or cured for a period of up to 2 years. In another aspect, the unprepared humic shale can be dried for a period of between 5 to 30 days. In another aspect, the unprepared humic shale can be dried by the application of heat, as noted above. In another aspect, the humic shale can be dried by circulating air through it. In any event, the period of drying is a function of the size of the humic shale particles and the surrounding environment required to substantially eliminate the aqueous solution from the unprepared humic shale such that is volumetric moisture content ranges from between 0.1 and 10 percent. In one aspect, a 500 pound pile of prepared humic shale is dried for a period of between 60 and 90 days with an average ambient temperature ranging from about 80 to about 100 degrees F. and an ambient relative humidity ranging from about 20 to about 40 percent.

Once dried, the humic shale is "prepared" humic shale and is now ready to be used in connection with the removal of pollutants from a fluid stream. In one aspect of the technology, the prepared humic shale is used to remove contaminants from water through a variety of sorbtion (both absorbtion and adsorption) forces, including hydrophilic bonding, hydrophobic bonding, hydrogen bonding, ion exchange, charge transfer, Van der Waals attractions, and ligand exchange. In one aspect of the technology, prepared humic shale may have a strong capacity to engage in cation exchange. It is believed, that the cation exchange chelates metals in water passed through the prepared humic shale and by adsorbtion to the surface of the prepared humic shale. The adsorption process depends upon several factors including, the physical properties of the prepared humic shale (surface area and pore size distribution), the precise chemical makeup of the prepared humic shale (e.g., the amount of hydrogen and oxygen), the chemical makeup and concentration of the contaminant, contaminant fluid pH and temperature, and the length of time the contaminated fluid is exposed to the prepared humic shale.

In one aspect of the technology, the prepared humic shale is crushed or broken into smaller pieces and inserted into a filtration column or tube. In one aspect, humic shale particles of different sizes are used in combination to filter contaminated water. For example, a first layer of prepared humic shale particles with a particle size between 20 and 50 nanometers is placed in a tube. A second layer of humic shale with a particle size between 0.5 and 5 nanometers is added to the tube beneath the first layer. The larger sized particles results in less shale/polluted stream contact and removes a first amount and/or type of contaminants from the waste stream. The second small sized layer results in greater shale/polluted stream contact and removes a second amount and/or type of contaminants from the waster. In another aspect, between 3-5 layers of prepared humic shale of varying particle sizes are used to remove varying types and/or concentrations of pollutants from the waste stream.

In another aspect of the technology, the prepared humic shale is used in connection with other filtration or pollution removing media. In one aspect, a first layer of activated carbon is placed in a container or tube (e.g., a 55-gallon drum, a 5 gallon bucket, a 15 gallon tube, etc.) as a finishing layer. A second layer of prepared humic shale is placed on top of the activated carbon layer. A contaminated fluid is then passed through the container. In one aspect, the particle size of the first and second layers is the same and the different filtration media are relied upon. However, in another aspect, the different filtration media have different particle sizes. In one aspect where multiple layers of different filtration media are used, the particle sizes are graduated. Meaning at the top of the filtration system (i.e., the top of the 55-gallon drum, e.g.) the particle sizes of the filtration media are relatively larger than the particle sizes of the filtration media at the bottom of the system. Each successive layer (2 or more, e.g.) has a smaller particle size to increase contact time between the waste stream and the filtration media as the waste stream progresses through the system. In this manner, as the tendency of pollutants to be removed from the waste stream decreases, due to the decrease of the amount of pollutants in the waste stream, the rate of removal of pollutants from the waste stream remains relatively constant.

Figure 2:
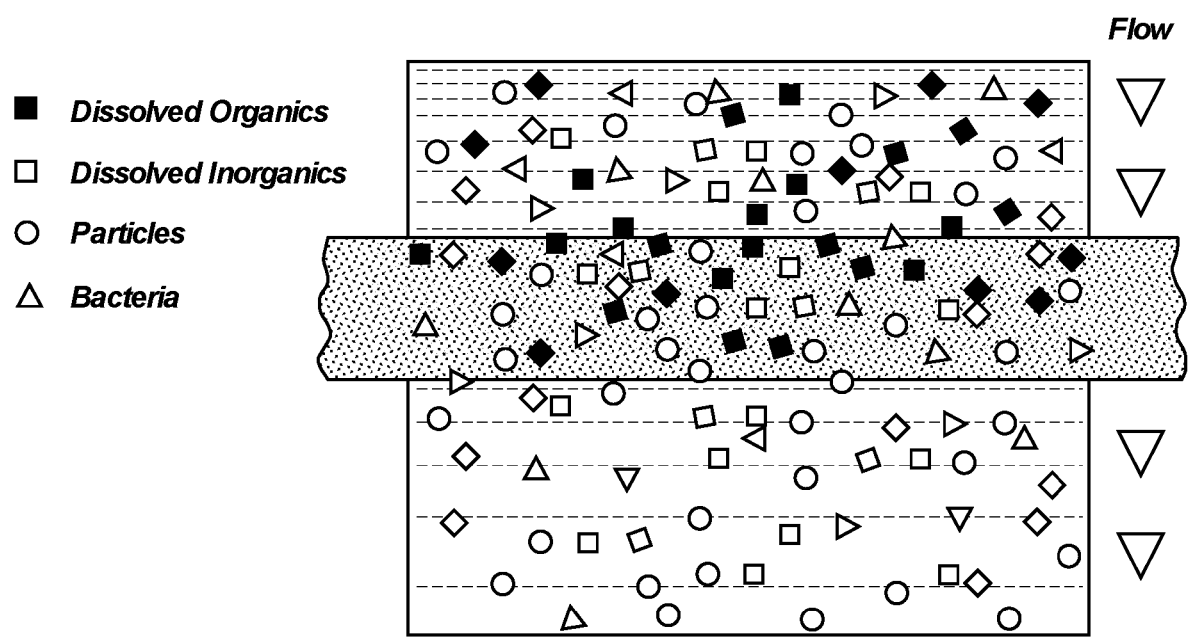
FIG. 2 is a diagram showing pollutants in air or water filtered by a humic substance in accordance with one aspect of the technology.
Figure 3:
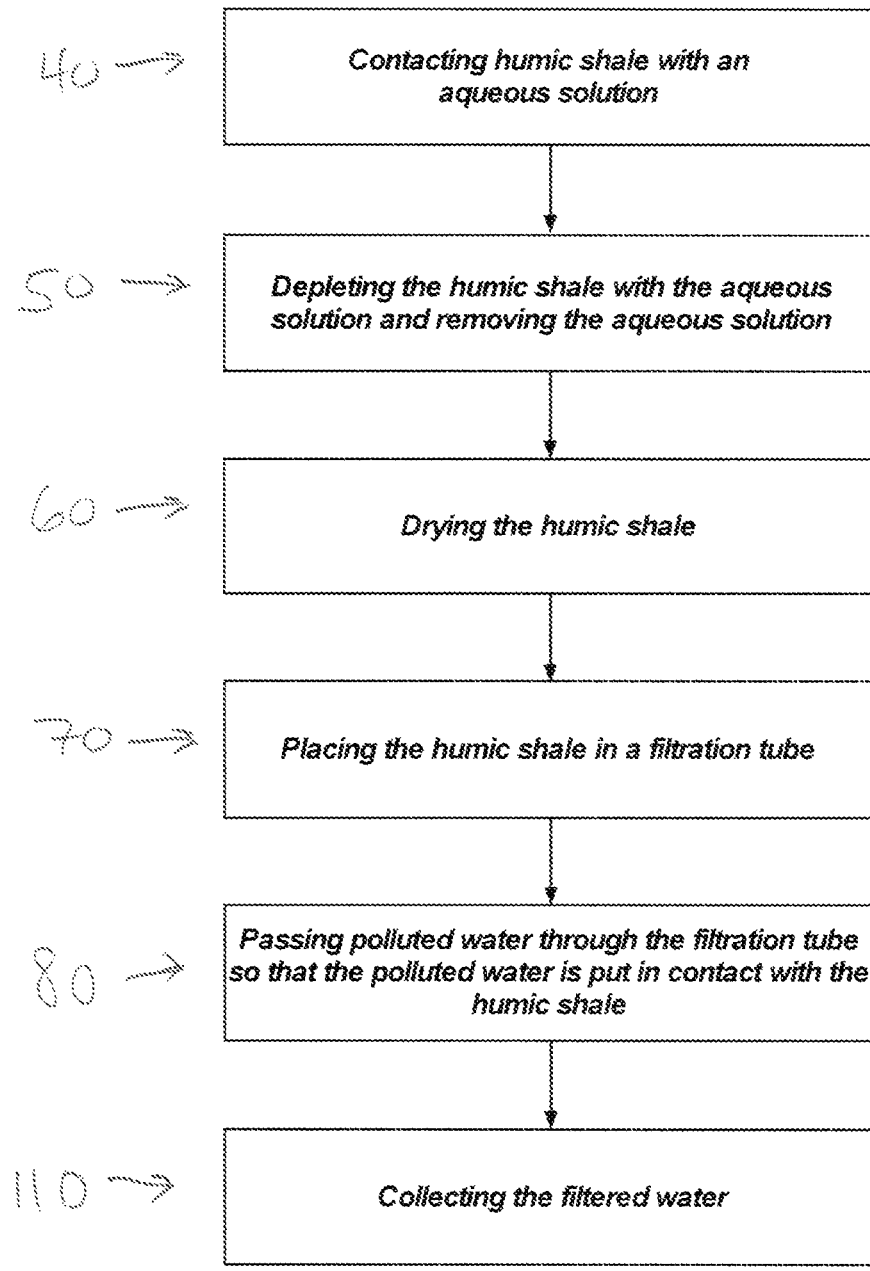
FIG. 3 is a flow chart showing a method of filtering a fluid using a humic substance in accordance with one aspect of the technology.
Figure 4:
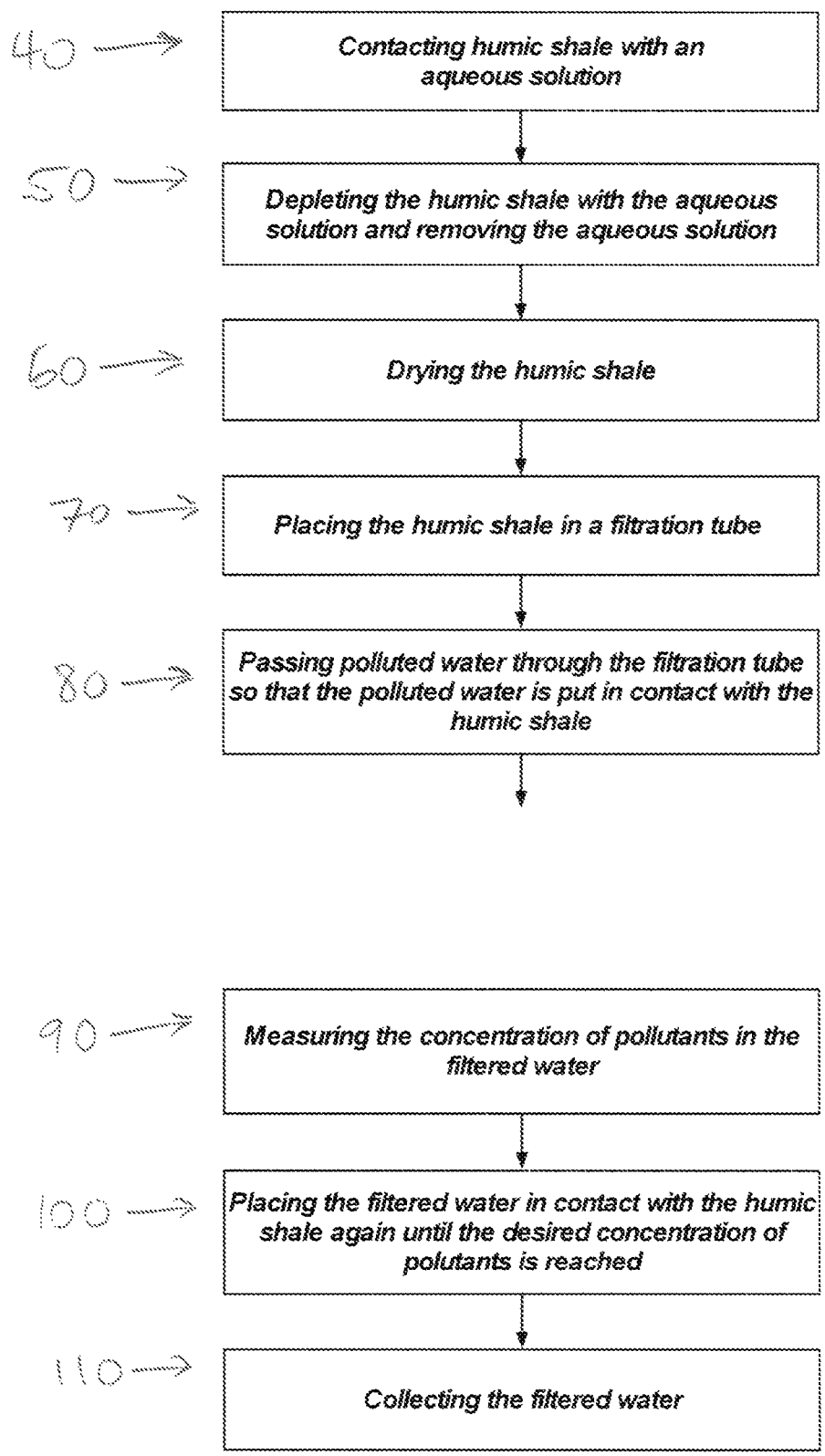
FIG. 4 is a flow chart showing a method of filtering a fluid using a humic substance in accordance with one aspect of the technology.

FIG. 1 discloses a diagram showing polluted water 10 filtered by a filtration tube packed with humic shale 20 from a water source such as groundwater, a stream, or a river as well as a house filtration system. The fluid may be gravity fed through the prepared humic shale or it may be pressurized. However, it is understood that the technology may be used in connection with any contaminated air or water source. For example, one or more containers with prepared humic shale 20 can be coupled to a contaminated pressurized air or water source 30 and fed through one or more containers containing prepared humic shale 20. In one aspect of the technology, one or more disposable containers are coupled in-line with a pressurized contaminated waste stream and are configured to be removed once the ability of the prepared humic shale to remove contaminants has been reduced to below an acceptable level. FIG. 2 discloses wherein a plurality of different layers of prepared humic shale are used as a filter to remove contaminants from a waste stream. With respect to FIG. 2, while specific reference is made to the filtration of dissolved organics from the waste stream, it is understood that in certain aspects of the technology dissolved inorganics are also filtered by the technology and removed from the waste stream. FIGS. 3 and 4 disclose different methods of preparing humic shale and treating a waste stream in accordance with different aspects of the technology. Specifically, aspects of the technology comprise contacting unprepared humic shale with an aqueous solution 40, depleting certain soluble components from the humic shale through contact with the aqueous solution 50, drying the humic shale 60, placing the humic shale in a container 70, and passing a contaminated fluid through the container to remove contaminants from the fluid 80. Additional aspects comprise measuring the concentration of pollutants in effluent emanating from the container 90, placing the contaminated waste stream again in contact with the humic shale and repeating the process until the desired contaminant level is reached 100, and collecting the filtered water 110.

EXAMPLES OF PREPARING HUMIC SHALE

Example 1

Preparing Humic Shale for Use in Fluid Treatment

Humic shale that can be used in accordance with embodiments of the present disclosure is prepared in accordance to the following procedure. A large container (e.g. 55 gallon stainless steel drum, a vat or plastic drum) is filled with 35 to 45 pounds per cubic foot of unprepared humic shale. A 55-gallon volume of water, such as distilled water, is poured over the top of the humic shale and allowed to pass over and through the unprepared humic shale. Additional 55-gallon volumes of water are added daily and allowed to percolate over and through the unprepared humic shale. The effluent liquid (i.e., the liquid that has passed through the 55-gallon drum of unprepared humic shale, collects in the bottom of the container and can be removed. The specific gravity of the effluent fluid is measured using a hydrometer (reference substance distilled water). When the specific gravity of the effluent liquid gets below a predetermined level (e.g., less than 1, between 0.9 and 1, between 0.8 and 1, and between 0.8 and 0.9) the humic shale is ready to be dried.

Example 2

Preparing Humic Shale for Use in Fluid Treatment

An aqueous solution can be used in accordance with embodiments of the present disclosure is prepared in accordance to the following procedure. A large container (e.g. 55 gallon stainless steel drum or other container) is filled with 30 to 40 pounds per cu. ft. of unprepared humic shale that has been dried for a period (e.g., 2-5 years). A gallon of water (e.g. distilled water) is poured over the top of the humic shale daily for a period of 6-12 months and allowed to pass over and through the unprepared humic shale. The effluent liquid collects in the bottom of the container. The specific gravity of the fluid is measured using a hydrometer (reference substance distilled water). In one aspect, the specific gravity of the effluent is determined to be greater than one after a first treatment of a gallon of water. After numerous treatments of water, when the specific gravity of the effluent liquid gets below a predetermined amount (e.g., less than 1), the humic shale is ready to be dried.

Additional examples of uses of prepared humic shale to remove pollutants from a waste stream are presented below. It is understood, however, that the different aspects presented throughout the application may be combined or modified with different components of the aspects as suits a particular design.

EXAMPLES OF USING PREPARED HUMIC SHALE TO TREAT CONTAMINATED FLUIDS

Example 1

Using Prepared Humic Shale to Filter Hydrocarbons from Water

Water polluted with hydrocarbons, such as benzene, naphthalene, toluene, and the like, are placed in contact with prepared humic shale. In one aspect, the prepared humic shale has been crushed into small particles. The particles size may range from 0.5 to 50 nanometers. The small particles are packed into a tube, through which the polluted fluid (e.g., water) is passed. When the fluid comes in contact with the prepared humic shale, pollutants bind to the prepared humic shale through a hydrophobic (or other) bonding mechanism and are removed from the fluid. After the fluid passes through the tube packed with prepared humic shale, it may be analyzed to determine the concentration of hydrocarbon remaining. If undesirable levels of hydrocarbons still remain, the effluent may be passed through the prepared humic shale tube repeatedly until all hydrocarbons are removed or their levels in the effluent water are acceptable.

Example 2

Using Prepared Humic Shale to Filter Herbicides and Pesticides from Water

Water polluted with organic pesticides, are placed in contact with prepared humic shale. In one aspect, the prepared humic shale has been crushed into small particles. The particles size may range from 0.5 to 50 nanometers. The small particles are packed into a tube, through which the polluted water is passed. When the water comes in contact with the humic shale, the metals are chelated and bind to the prepared humic shale and the organic molecules of the pesticide bind to the prepared humic shale through ion exchange or another sorptive mechanism. In one aspect, the ion exchange occurs at the carboxylic-OH group of the organic molecule and is removed from the water. After the water passes through the prepared humic shale packed tube, it may be analyzed to determine the concentration of organic pesticide remaining. If undesirable levels of organic pesticide still remain, the effluent may be passed through the prepared humic shale packed pipe repeatedly until all organic pesticide is removed or its levels in the effluent water are acceptable.

Example 3

Using Prepared Humic Shale to Filter Metals from Water

Water polluted with organic pesticides, are placed in contact with prepared humic shale. In one aspect, the prepared humic shale has been crushed into small particles. The particles size may range from 0.5 to 50 nanometers. In one aspect, the particle size may range from 0.5 to 5 nanometers. The small particles are packed into a tube, through which the polluted water is passed. When the water comes in contact with the humic shale, the metals are chelated and bind to the humic shale. After the water passes through the humic shale packed tube, it may be analyzed to determine the concentration of metals remaining. If undesirable levels of metals still remain, the effluent may be passed through the humic shale packed pipe repeatedly until all metals are removed or its levels in the effluent water are acceptable. In one aspect, the metals bind with the humic shale and form a precipitate, which is collected with the effluent water. The precipitate may then be removed using methods known in the art for separating precipitate from liquids.

The tables below show the removal of metals from water using the method disclosed above. The water was initially tested to show contamination levels as shown below. The water was then treated by placing the contaminated water in contact with prepared humic shale and retested for contaminants.

| Constituent | Original Concentration (ug/l) | Effluent Concentration (ug/l) |
|---|---|---|
| Arsenic | 859 | 316 |
| Cadmium | 38.4 | <3.0 |
| Iron | 1770 | <100 |
| Lead | 758 | 6.5 |

Example 4

Using Prepared Humic Shale to Filter Radionuclides

Water polluted with radionuclides, such as uranium, are placed in contact with prepared humic shale. In one aspect, the prepared humic shale has been crushed into small particles. The particles size may range from 0.5 to 50 nanometers. In one aspect, the particle size may range from 0.5 to 5 nanometers. The small particles are packed into a tube, through which the polluted water is passed. When the water comes in contact with the humic shale, the radionuclides are chelated because of the strong cation characteristics of the humic shale. After the water passes through the prepared humic shale packed pipe, it may be analyzed to determine the concentration of radionuclides remaining. If undesirable levels of metals still remain, the effluent may be passed through the humic shale packed pipe repeatedly until the metals are removed or the levels in the effluent water are acceptable. In one aspect, the metals bind with the prepared humic shale and form a precipitate, which is collected with the effluent water. The precipitate may then be removed using methods known in the art.

Example 5

Using Humic Shale to Filter Air

Polluted air can be placed in contact with prepared humic shale to remove contaminants from the polluted air. In one aspect of the technology, polluted air is placed in contact with granulated humic shale. The granulated humic shale may be sized between 20 and 50 nanometers. In one aspect of the technology, pressurized air is forced to contact the prepared humic shale and pass through and around the prepared humic shale.

Generally speaking, as the molecular weight of contaminants increases, it is believed that the prepared humic shale adsorbs more effectively because the molecules are less soluble in water. However, the pore structure of the prepared humic shale must be large enough to allow the molecules to migrate within. A mixture of high and low molecular weight molecules may be used for the removal of the more difficult species. Many organic contaminants are less soluble and more readily adsorbed at a lower pH. As the pH increases, removal decreases. In one aspect of the technology, the size of the prepared humic shale bed used to treat contaminated fluids is increased by twenty percent for every pH unit of the contaminant above neutral (7.0). In addition, the higher the contaminant concentration, the greater the removal capacity of prepared humic shale. The contaminant molecule is more likely to diffuse into a pore and become adsorbed. As concentrations increase, however, so do effluent leakages. It is believed that the upper limit for contaminants at contact times less than 1 day is a few hundred parts per million. Higher contaminant concentration may require more contact time with the prepared humic shale. Also, the removal of organics is enhanced by the presence of hardness in the contaminant stream, so whenever possible, any prepared humic shale units should be upstream of any ion removal units.

Generally, the lower the flow rate of the contaminant stream, the more time the contaminant will have to diffuse into a pore and be adsorbed. Adsorption by the prepared humic shale is believed to be improved by a longer contact time. In addition, higher water temperatures decrease the solution viscosity and can increase die diffusion rate, thereby increasing adsorption. Higher temperatures can also disrupt the adsorptive bond and slightly decrease adsorption. It depends on the organic compound being removed, but generally, lower temperatures are likely to favor adsorption. Factors that decrease solubility and/or increase accessibility to the pores in the prepared humic shale improve the performance. In one aspect, it is believed that the filter capacity of the prepared humic shale can be roughly estimated at 0.1 pound of organics per 1 pound of prepared humic shale at a flow rate of 1 to 2 gallons per minute per cubic foot (gpm/cu.ft.) and a bed depth of 3 feet. In another aspect, the filter is configured to operate at less than a flow rate of 1 gallon per minute. In one aspect, where the bed depth is 1 foot by 4 feet, the flow rate of one inch of water is less than one gallon per minute.

In one aspect of the technology, it is believed that the prepared humic shale reduces the concentrations residual disinfectants (chlorine and chloramine) through a catalytic reduction reaction. This is a chemical reaction that involves a transfer of electrons from the prepared humic shale surface to the residual disinfectant. In other words, it is believed that the prepared humic shale acts as a reducing agent. The removal of chlorine reduces the chlorine to a non-oxidative chloride ion. In one aspect of the technology, it is believed that the chlorine capacity of prepared humic shale is 1 pound of chlorine per pound of prepared humic shale at a flow rate of 3 to 5 gpm/cu.ft. and a bed depth of 3 feet. It is believed that chloramine removal is a much slower reaction. The predominant species of chloramine in city water supplies (pH about 7 to 8) is monochloramine. It is believed that the reaction with prepared humic shale and monochloramine also renders a non-oxidative chloride ion. Since the rate of reaction is considerably slower, the flow rate is 0.4 to 0.6 gpm/cu.ft. and the bed depth greater than 3 feet.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

Uses of the methods described above include, but are not limited to, filtering water used in mining operations, filtering water contaminated by oil spills, filtering water contaminated by nuclear reactor incidents, filtering tap water, filtering underground water, filtering the flow of river water, filtering air within an enclosed space, and filtering atmospheric air.

It is noted that no specific order is required in these methods unless required by the claims set forth herein, though generally in some embodiments, the method steps can be carried out sequentially.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. A method of treating a contaminated fluid, comprising:
   disposing unprepared humic shale in a container;
   contacting the unprepared humic shale with an aqueous solution;
   maintaining the aqueous solution in contact with the unprepared humic material for a predetermined period of time;
   removing the aqueous solution from contact with the unprepared humic material;
   drying the unprepared humic shale after the aqueous solution is removed from contact with the unprepared humic shale thereby converting the unprepared humic shale into a prepared humic shale; and
   after drying the unprepared humic shale, placing the contaminated fluid in contact with the prepared humic shale and passing the contaminated fluid through the prepared humic shale, wherein the prepared humic shale is disposed in a filter, until a pollutant is removed from the contaminated fluid.

2. The method of claim 1 wherein the unprepared humic shale is placed in contact with the aqueous solution for a period of 6-12 months.

3. The method of claim 1, wherein the unprepared humic shale is placed in contact with the aqueous solution for a period of 30 to 90 days.

4. The method of claim 1, wherein when the aqueous solution is in contact with the unprepared humic shale, the aqueous solution comprises a temperature greater than the ambient temperature about the unprepared humic shale.

5. The method of claim 1, wherein when the aqueous solution is in contact with the unprepared humic shale, the unprepared humic shale is heated to a temperature greater than ambient temperature.

6. The method of claim 1 wherein the unprepared humic shale is dried for a period of 3-5 years.

7. The method of claim 1, wherein the unprepared humic shale is dried for a period of 30 days.

8. The method of claim 1, wherein the unprepared humic shale is dried for a period of between 5 and 30 days.

9. The method of claim 1, wherein the contaminated fluid is passed through the prepared humic shale at a rate ranging from 0.4 to 0.6 gallons per minute.

10. The method of claim 1, wherein the contaminated fluid is passed through the prepared humic shale at a rate ranging from 1 to 2 gallons per minute.

11. The method of claim 1, wherein the contaminated fluid is passed through the prepared humic shale at a rate ranging from 3 to 5 gallons per minute.

12. The method of claim 1, wherein the unprepared humic shale is dried until its volumetric water content ranges from between about 0.1 to about 10 percent.

13. The method of claim 1, further comprising heating the unprepared humic shale after the aqueous solution is no longer in contact with the unprepared humic shale.

14. The method of claim 1, wherein the aqueous solution comprises water, distilled water, or alcohol.

* * * * *